(12) United States Patent
Delaney et al.

(10) Patent No.: US 6,358,442 B1
(45) Date of Patent: *Mar. 19, 2002

(54) ANIMATED LIGHT DIFFRACTING, PRISMATIC REFRACTING, AND/OR HOLOGRAPHIC SURFACE PAPERS, BOARD AND OTHER SUBSTRATES AND LOW-COST PATTERN TRANSFER METHOD OF MANUFACTURING THE SAME

(75) Inventors: William Delaney, Stow, MA (US); Richard Hovasse, Londonderry, NH (US)

(73) Assignee: Metallized Products, Inc., Winchester, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,783

(22) Filed: Mar. 19, 1997

(51) Int. Cl.⁷ ............................................. B29D 11/00
(52) U.S. Cl. .................... 264/1.31; 264/1.36; 264/1.38; 264/1.6; 264/1.7
(58) Field of Search ................... 264/1.31, 1.34, 264/1.6, 1.7, 1.9, 1.36, 1.38; 427/162

(56) References Cited

U.S. PATENT DOCUMENTS

| | | | | |
|---|---|---|---|---|
| 3,882,207 A | * | 5/1975 | Hannan et al. | 264/1.6 |
| 4,250,209 A | * | 2/1981 | de Leeuw et al. | |
| 4,601,861 A | * | 7/1986 | Pricone et al. | 264/1.6 |
| 4,933,120 A | * | 6/1990 | D'Amato et al. | 264/1.9 |
| 5,155,604 A | * | 10/1992 | Miekka et al. | 264/1.7 |

* cited by examiner

*Primary Examiner*—Mathieu D. Vargot
(74) *Attorney, Agent, or Firm*—Rines and Rines (57) ABSTRACT

A low-cost method of making unique and printable holographic papers and the like with the aid of radiation-curable coatings and flexible embossed or engraved flexible web film masters, and as a single, non-laminated sheet; and novel improved diffraction-refraction and holographic high-gloss surface papers, boards and the like, clear, metallized, pigmented or tinted.

9 Claims, 5 Drawing Sheets

(2 of 5 Drawing Sheet(s) Filed in Color)

ANIMATED LIGHT DIFFRACTING, PRISMATIC REFRACTING, AND/OR HOLOGRAPHIC SURFACE PAPERS, BOARD AND OTHER SUBSTRATES AND LOW-COST PATTERN TRANSFER METHOD OF MANUFACTURING THE SAME

The present invention relates to papers and similar substrates bearing embossed light-diffracting and holographic type fine line multi-color prism-like refracting surface patterns and images; being more particularly directed to novel methods of manufacturing such papers, boards and other substrates without requiring the laminating of decorative embossed-pattern surfaces thereupon, and to improved and less expensive single integral film or sheet substrates of this character.

BACKGROUND

The art is replete with processes for laminating thin sheets to paper and paper-like surfaces, including metallized layers, upon which patterns or images or other data have been impressed or transferred from surfaces containing such patterns or images or the like.

Coatings providing smooth and other surfaces and metallized film layers and the like have also been provided upon paper-like surfaces, and adhered thereto by ultraviolet (u.v.) and electron beam (e.b.) radiation-curable adhesive coatings, such as described, for example, in U.S. Pat. Nos. 4,490,409 and 4,246,297. The latter, for example, have been widely used for glossy decorative paper wrappings and similar applications.

Relatively recent interest in holography and in intricate light-refracting and diffracting surface patterns in general has enabled the producing of unique multi-faceted varied color surface effects on paper, board and other substrates that not only are highly decorative but, for important useages where duplication is not desired (currency, stock or bond certificates, credit cards, etc.), cannot be faithfully copied on xerographic reproducing machines, or otherwise easily counterfeited. The prior art layering or laminating of light-diffracting films or layers to paper or other substrates, and similar processes used to achieve these results, however, are relatively expensive and require multiple steps of fabrication.

The use of metallized papers, adapted for printing, has been expanding for a variety of applications, including printable product labels and the like, and with the high-quality glossy decorative appearance rendering them most desirable also for gift wrappings, packaging, gift bags and other uses. Light interference surface effects have been produced by embossing fine lines into a coated layer on paper and then metallizing the embossed surface to give rise to prism-like multi-color refraction and diffraction effects, producing predetermined patterns and images, including holographic images, where desired, and that present changing shiny, multi-color mirror-like effects at different viewing angles.

Such papers have heretofore been produced by applying a thin layer of pre-lacquer to the base paper, drying the lacquer to a hard finish, and embossing the lacquered surface by conventional embossing rotary metal dies, under heat and pressure. The dried paper is then introduced into a metallizing vacuum chamber where a very thin layer of aluminum or other metal (say 2 millionths of an inch or so) is deposited to metal-coat the embossed lines so as to provide a metallized light-reflecting line pattern, The metallized paper is then returned to the coater station where the paper is top-coated with a print primer and remoisturized, in view of the earlier layer drying, as described, for example, in the 1994 bulletin of van Leer Metallized Products of Franklin, Massachusetts, entitled Illuminations.

As further explained in the Van Leer 1996 Holo PRISM™ bulletin, optimally to produce light-diffraction gratings and similar optically ruled or otherwise engraved or cut fine line surface patterns, a line spacing of the order of about 25,000 per inch will generate optimal prism-like multi-color light diffraction and holographic images or patterns and the like.

Underlying the present invention, on the other hand, is the discovery of how the appropriate use of e.b. curable adhesive thin layer coatings on paper and similar substrates, and/or u.v. in some cases, can enable the direct and inexpensive, but highly faithfully reproduced transfer of intricate diffracting-refracting and holographic surface prismatic embossings from thin flexible embossed film or web masters, and without requiring the use of any additional embossing metal dies, or separate fabrication steps, or top coats, or paper remoisturizing, or layer laminations on the substrates.

OBJECTS OF INVENTION

An object of the invention, accordingly, is to provide a new and improved method of directly transferring to paper, board and other substrates and the like, the fine-line patterns of light diffracting-refracting and holographic images, and with a relatively low-cost u.v. or e.b.-curable coating pattern or image transfer technique using preferably an appropriate flexible pattern-embossed film web master.

A further object is to provide improved diffracting, refracting and/or holographic products produced by such method.

Other and further objects will be explained hereinafter and are more particularly delineated in the appended claims.

SUMMARY

In summary, however, from one of its important aspects, and where metallizing is not involved, the invention embraces a method of producing on a substrate surface predetermined multi-color diffraction-refraction effects and patterns, that comprises, applying between a flexible film master, provided with an embossed predetermined diffraction pattern formed of fine lines, and a substrate surface, a radiation-curable adhesive coating material of a type that, when radiation cured, will integrally bond to the substrate surface but not to the material of the embossed film master; pressing the flexible film master and substrate together with the coating interposed to cause the surface of the coating adjacent the embossed film master to become impressed with a faithful reproduction of the predetermined fine line diffraction pattern of the film master; radiation-curing the adhesive coating to set the impressed diffraction pattern in said coating surface upon the radiation-curing of the coating, while integrally bonding the coating to the substrate surface; and stripping the resulting integral diffraction-patterned coated substrate from the flexible film master.

The invention also is most useful where the film master has been metallized and the metal layer is adhered to the paper to generate even more spectacular shiny multi-colored effects.

Best mode and preferred embodiments and designs and products will hereinafter be more fully detailed.

DRAWINGS

The file of this patent contains at least one drawing executed in color. Copies of this patent with color drawing(s) will be provided by the Patent and Trademark Office upon request and payment of the necessary fee.

The invention will now be described with reference to the accompanying drawings, FIGS. 1A, 1B and 1C of which are side elevations of successive steps in the preferred method or process of the invention, as applied to non-metallized substrate applications, resulting in the stripped-away novel single-sheet product of FIG. 1C.

DESCRIPTION OF PREFERRED EMBODIMENTS(S)

One of the discoveries underlying the present invention, totally obviates the need and, indeed, the complications of applying metal die and rotary drum embossing systems to the ultimate paper or other substrate product. Surprisingly, it has been found that thin flexible films carrying embossed, engraved or otherwise cut or formed diffraction fine line pattern(s) or images, (all generically embraced by the terms "embossing" or "embossed" herein), can themselves be used as the embossing master. As above discussed, the embossed diffraction patterns are of fine lines, preferably, though not always essentially, of the order of about 25,000 per inch, to achieve the full preferred ultimate diffraction-refraction prism-like multi-colored effects herein desired on the product surface. In accordance with the preferred practice of the invention, these lines forming the desired diffraction patterns, are carried on a surface of a preferably relatively thin flexible plastic film or sheet master I, FIG. 1A, as of polyolefin plastic film such as polypropylene or appropriate polyesters, of the order, generally, in the range of about 48 gauge to 142 gauge. The thickness is sufficient to permit the embossing of the very fine line patterns L, by any desired technique, into the film master. For artistic patterns, the lines may diverge at various angles and have varying depths to provide the prism-like refraction-diffraction effects; and, where desired, holographic image effects, achieving different colors, brightnesses and depths as viewed from different angles of incidence. The flexible film master, must be thick enough to permit the embossing or forming into one of its surfaces of such refraction-diffraction fine lines or rulings, but preferably, however, not thinner than about the order of 70 gauge in the case of polypropylene or 48 gauge in the case of polyester, for example, to enable best use of the transfer process of the invention.

Figure 1A:
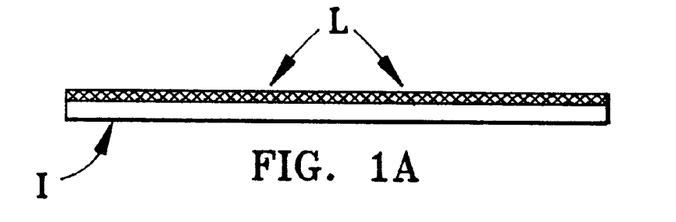
Figure 1B:
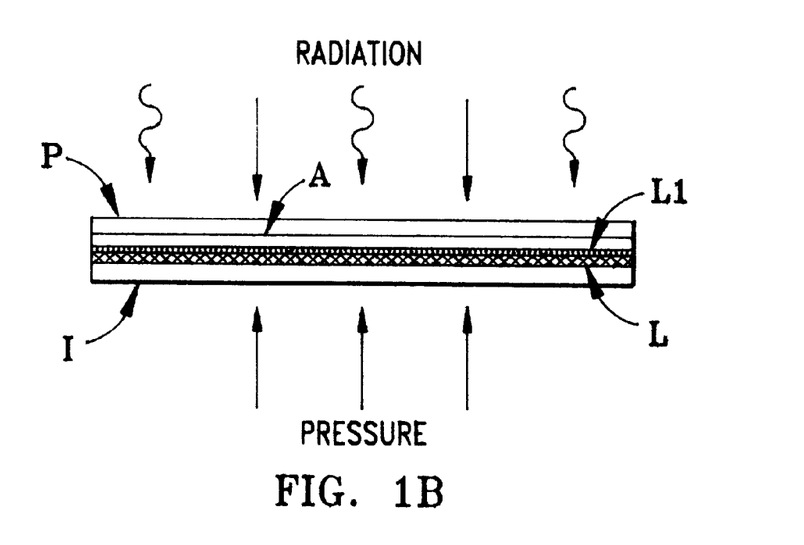

In FIG. 1B, a paper substrate P, ranging, for example, from thin papers to, say, 26-point board or the like, (where the term "paper" is used herein generically to embrace all papers and boards and the like) has been coated on one side or surface with a thin e.b. or u.v.-curable adhesive layer A, such as a radiation-curable epoxy acrylate or urethane acrylate or the like, say, of the order about 0.0625–0.625 mils in thickness (1–10 pounds per 3000 ft$^2$). Alternatively, the embossed side of the flexible film master 1 may be so coated.

Figure 1C:
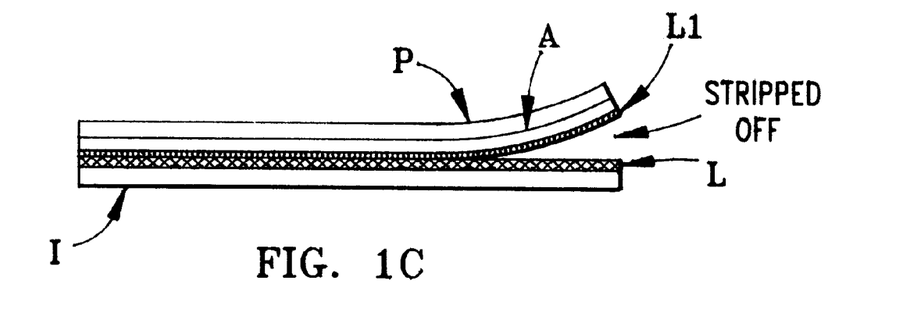

The substrate P and film master I, with the interposed applied coating A therebetween, are flexibly pressed together to insure that the surface of the adhesive coating material A adjacent the film master faithfully fills and becomes impressed by the diffraction-refraction lines L in the flexible film master I. Upon radiation curing, so labeled, under such continued contact, as by passing the pressed-together flexible film master I and the substrate P with the interposed coating A under a curing station R, FIG. 3, (e.b. of, for example, about 120–300 kilovolts (KV) and a dose of about 2–5 megarads, as with, for example, an Energy Sciences Model EC125/180/1050 electron beam machine, or about a 300–600 watts/inch u.v. station as with a Fusion Model of VMPE-8/7(F600V), the thin interposed layer A cures, permanently setting or casting a faithful reproduction of the embossed diffraction pattern L in the adjacent cured coating surface at L1, FIG. 1C, and bonding the coating to the substrate P. The properties of the material of the film web master I and the coating A must be selected, however, such that the cured coating A will not bond to the film master I, so that the integral product P-A, with the cured coating now fixedly set and impressed with pattern L1, may be readily released or stripped away from the film master 1, as shown in FIG. 1C.

It has been found that such a product has become extremely faithfully imbued with the same diffraction-refraction and/or holographic imaging properties as the original embossed film master, achieving a low cost single sheet diffracting paper with the desired multi-color prism-like effects.

Examples of suitable embossable thin flexible film master materials, such as preferred plastic polyolefins of polypropylene and polyurethane and the polyester films, were noted above; but there are other plastics and other materials, such as polyethylene, that though physically not readily directly engravable or embossable to serve as an embossing film master, can be adapted for such purpose. The present invention enables such adaptation of normally non-embossable films or sheets for such use through the use of the curable adhesive coating of the invention and the pressing against a suitable master film while curing the adhesive—in this case, an adhesive of the type curable to adhere or bond integrally to the polyethylene to provide it with an integral embossed diffraction pattern surface, but not adherable to the master web, so that the coated polyethylene may be stripped away therefrom after the curing. A suitable adhesive coating for this purpose would be SUN P87-2012 urethane acrylate.

Figure 4:
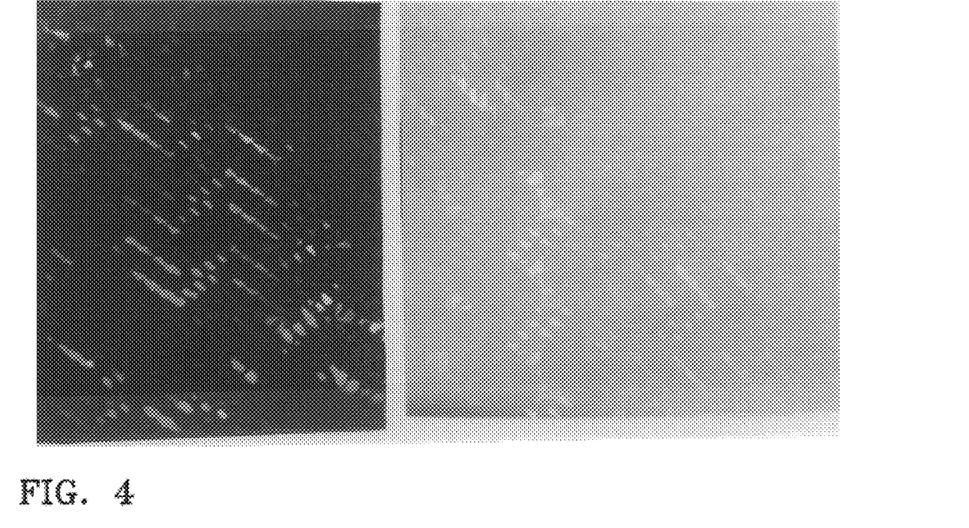
FIGS. 4–7, are photographs showing the vibrant effects produced with both unmetallized and metallized products of the invention.

With the type of radiation-curable acrylate adhesives above discussed, the cured coating with its inherent transferred cast-embossed pattern may be clear and transparent, providing the more subdued diffraction-refraction multi-color pattern effects for the single sheet paper substrate, as compared with more vibrant metallized versions, as later-discussed. Where desired, however, the coating may be pigmented or tinted, as by the use of $TiO_2$ or the like in the coating material, enabling different color effects where desired as shown in FIG. 4.

Other suitable radiation-curable adhesive coatings for the purposes of the invention include polyesters, urethanes, epoxies and pre-radical and cationic curable materials. A useful coating is JRX-1082 Quretech urethane acrylate adhesive. Other master mold web films or sheets than plastic films may include thin metal foil or the like. Other substrates than paper and board include textiles, non-woven fabrics, plastic films such as nylons, vinyls and polyethylene, and even metals foils or other substrates, and such are all generically referred to herein as "substrates" or substrate surfaces or the like.

Turning to the added use of metallization, with its more vibrant shiny effects, there are three alternative procedures that can be used with the techniques of the invention.

Figure 2A:
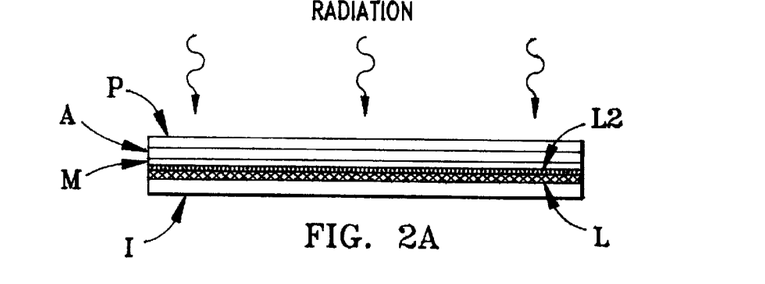
FIGS. 2A and 2B are similar views in which the embossing film master is metallized to provide an embossed metal layer for transfer to the paper or other substrate product.

First, the embossed film master 1 of FIG. 1A may be metallized, as before described, by using a vacuum deposition chamber, that deposits a very thin layer of metal, following the pattern of the embossed diffraction pattern lines L of the film master I, as shown in FIG. 2A at M, and reproducing the diffraction pattern L2 on the inner surface of the metal deposit M adjacent the film line pattern L. The outer surface of the metal layer may then be coated with the radiation-curable adhesive A of the invention, pressed against the paper or other substrate P and cured, with the resulting stripped off product P-M, FIG. 2B, having the extraordinary shiny prism-like and/or holographic effects.

Figure 7:
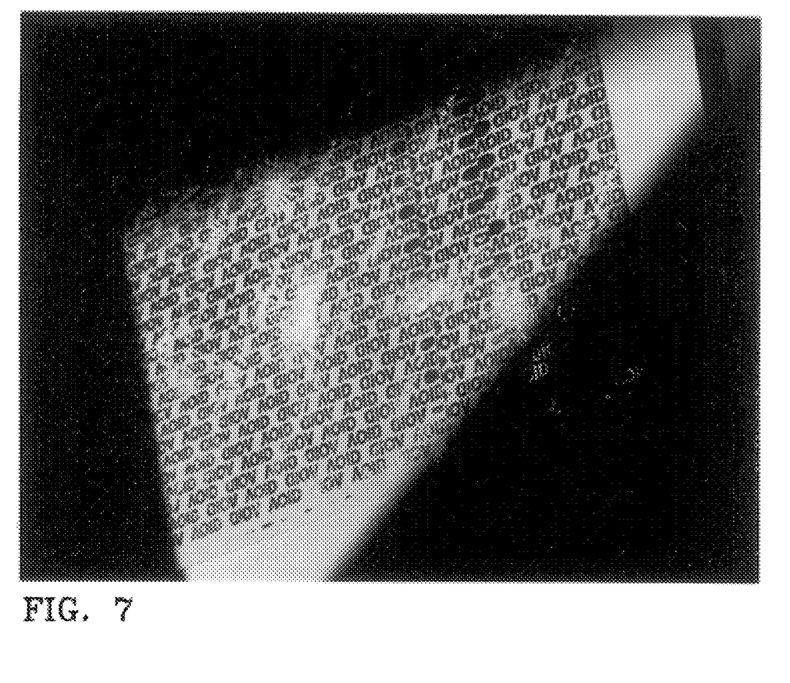

The invention, furthermore, permits selective transfer of patterns, words or images by printing, or applying the coating selectively. FIG. 7, later more fully discussed, shows the results of such selective coating printing in the process of FIGS. 2A and 2B. The cured coating, moreover, may be printable, scorable, gluable, die-cuttable, etc., in all cases.

Secondly, following the technique of FIGS. 1A–C, the embossed film master 1 may be coated with the radiation-curable adhesive A (or the paper or other substrate P may be so-coated) and again pressed together with the substrate P, followed by radiation curing of the intermediate adhesive layer A, FIG. 1B, and then stripping from the film, as in FIG. 1C. The resulting impressed embossed diffraction pattern transferred to the cured coating A may then be metallized at M, FIG. 2C, to create the shiny vibrant diffraction effects of the resulting "embossed" mirror-like reflecting metal surface of the substrate.

Figure 2B:
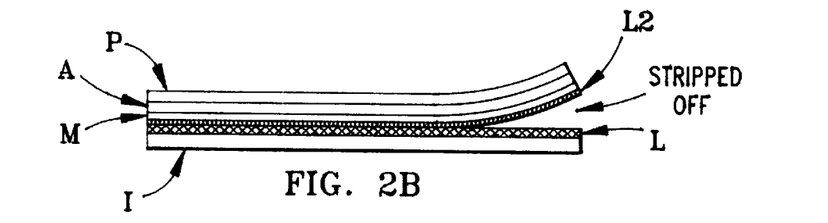
Figure 2C:
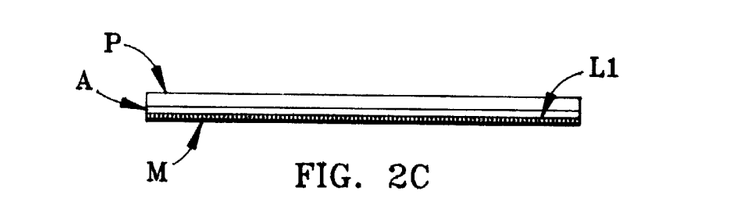
FIG. 2C and FIGS. 2D and E are similar views of modified metallizing sequences.
Figure 2D:
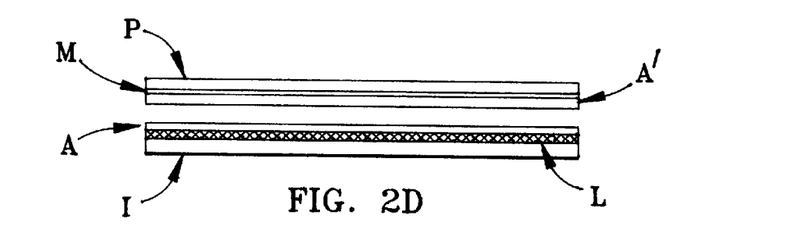
Figure 2E:
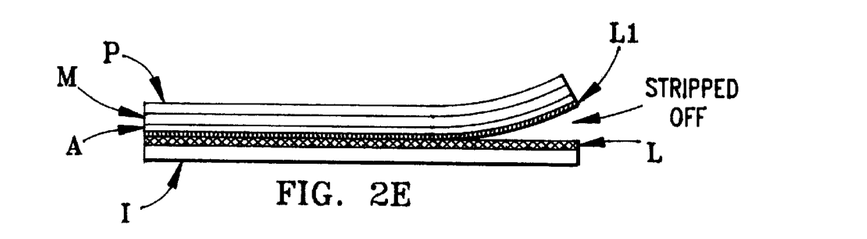

Thirdly, the paper or other substrate P may be metallized at M, FIG. 2D, and coated with the radiation-curable adhesive layer A' (or the embossed film master 1 may be so coated at A), with the film and metallized or foil laminated paper pressed together and the coating radiation-cured, as before, and stripped away from the film as in FIG. 2E.

Figure 3:
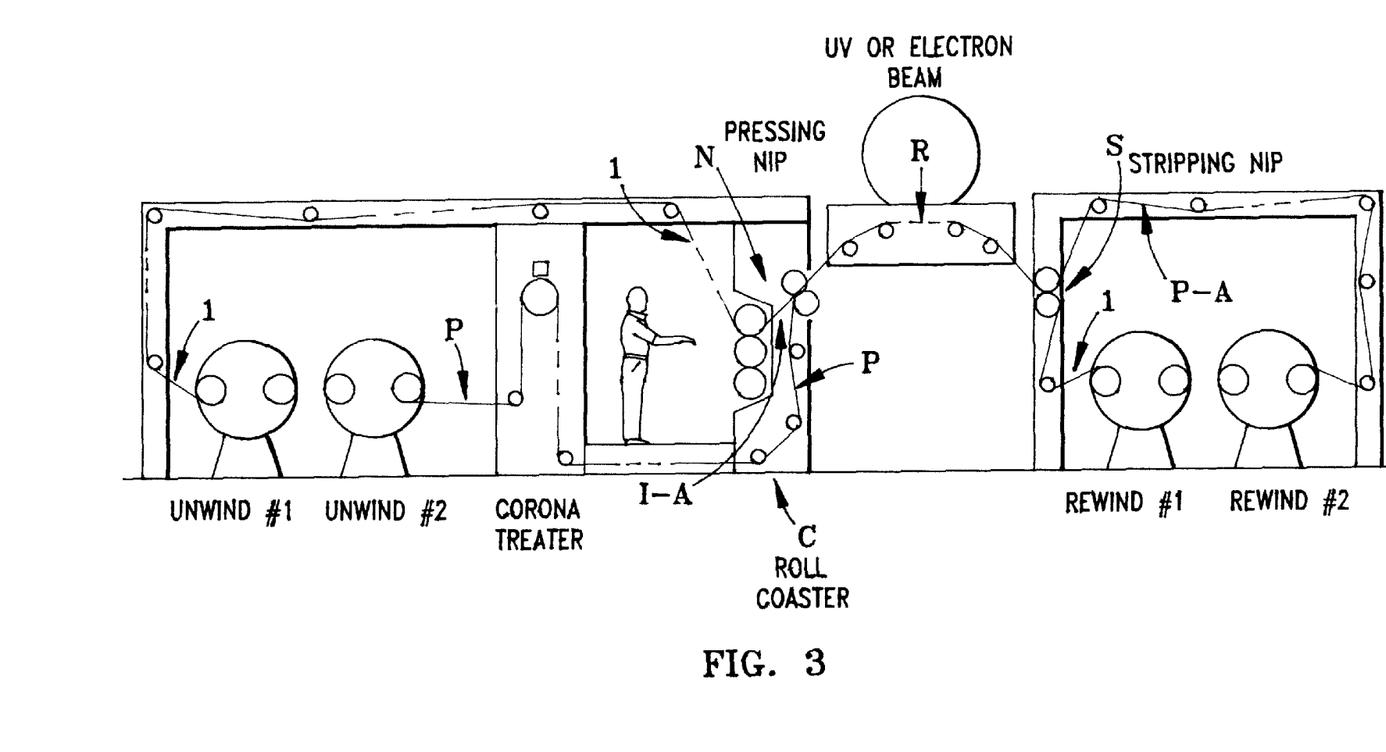
FIG. 3 is a schematic diagram of a suitable in-line manufacturing system for producing the product.

Suitable apparatus is shown in FIG. 3 for in-line production with the flexible embossed flexible film master web 1, unwinding from an unwind roll #1, and the paper or other substrate web P unwinding from roll #2 and then, after coating the embossing of the web master I, in this case, with the radiation-curable coating at a roll coater station C, passing the coated master web I-A to a nip station N, for pressing together on top of the substrate web P before passing under the radiation curing station R. This is followed, then, by stripping the product P-A from the film web 1 at S, and rewinding the product at rewind #1, and the film master web at rewind #2. The paper may be treated at a corona station before coating, as shown. The film web may then be re-used as a master for a wide variety of substrates, as later explained.

The techniques of the invention, as before pointed out, achieve these desirable diffracting surfaces or substrates without requiring the ultimate paper or other substrate to be subjected to conventional embossing or engraving dies and procedures and with a single step operation that does not dry the paper or other substrate and thus does not require remoisturizing nor the use of a top coat, and that can avoid laminating metallized or other diffraction surfaces to the paper, board or other substrate.

The non-lamination-based manufacturing process of the invention thus provides unique single-sheet diffraction-refraction and holographic papers and the like usefull particularly for the printing and packaging industries and elsewhere, as well. A high-gloss and attractive holographic surface is providable useful with all grades of papers and board (up to about 26 pts. thick, for example), and can be printed upon by standard methods, offering a new high-visibility alternate for cartons, labels, bags, cards, POP displays and advertisements, among other applications. The novel product, as before explained, is of relatively low cost, as compared with prior and other laminated products, and is durable and aesthetically appealing—and since it is not a laminate, nor been subjected to drying heat, maintains excellent lay-flat characteristics, with ready printibility and convertibility. The invention thus provides a most cost effective way to decorate paper or board or similar substrates. As before pointed out, a wide variety of substrates may be thus decorated and in varying widths, up to, say, 60 inches wide; and with a variety of substrates, including, for example, a 30-pound (48 g/sm) paper and upwards (MF, MG, MC papers), clay coated papers (40 pounds and upward), C/1/SSBS board and/or C/2SSBS board (8 pt.–26 pt), wet-strength papers (40 pounds and upward), and others, and with metallized, clear and pigmented surfaces, as desired.

As before mentioned, the photograph of FIG. 4 shows both a clear prismatic paper manufactured by transferring the prismatic pattern from a prismatic film master, using the technique of FIGS. 1B and 1C, and the same with a red-tinted adhesive coating.

Figure 5:
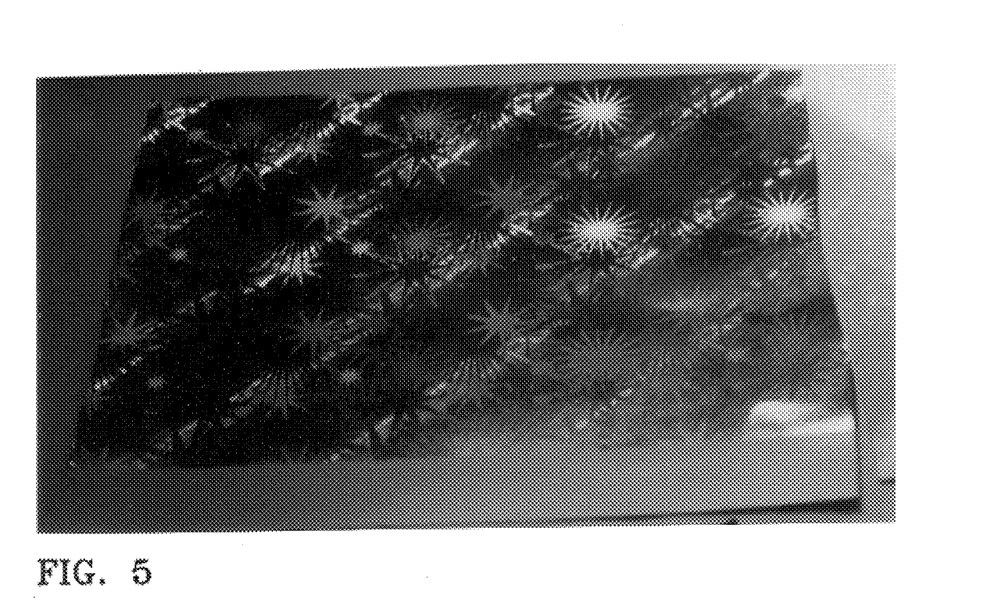

FIG. 5 shows a prismatic dark paper manufactured by transferring the metal layer from a metallized prismatic embossed film in accordance with the technique of FIGS. 2A and 2B.

Figure 6:
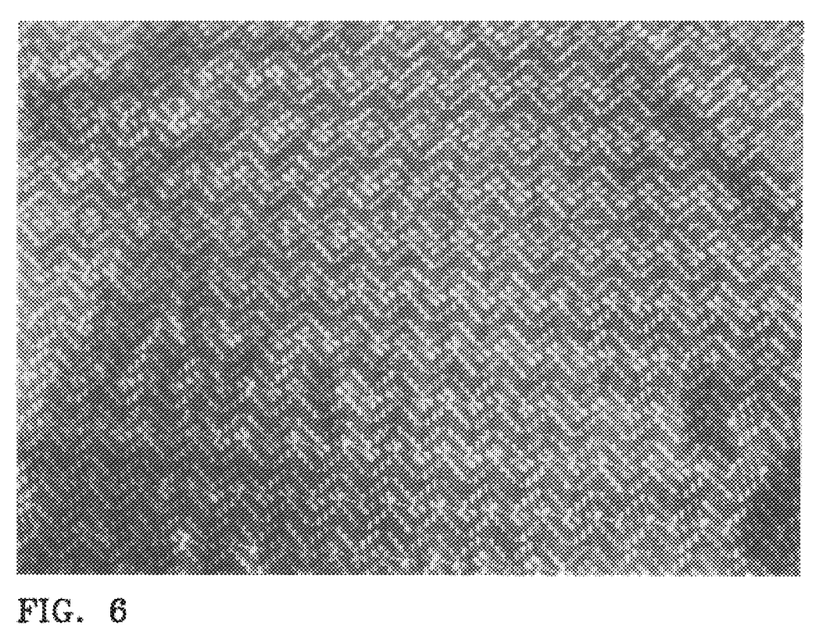

FIG. 6 shows a clear prismatic black paper manufactured by transferring the prismatic pattern from a clear prismatic film master; and FIG. 7 shows selectively metallized prismatic white paper manufactured by selectively printing the adhesive in the desired pattern on the prismatic film master, pressing to the paper, and curing and stripping away the partially de-metallized film master from the paper (see "void").

The invention also provides a low cost technique for reproducing ruled diffraction grating patterns and the like on paper and similar substrates from a flexible film master.

Further modifications will also occur to those skilled in this art and such are considered to fall within the spirit and scope of the invention as defined in the appended claims.

What is claimed is:

1. A method of producing on a substrate surface any of predetermined multi-color diffraction-refraction effects, patterns and holograms, that comprises, applying between a flexible thin thermoplastic film master of predetermined thickness provided with an embossed predetermined diffraction pattern formed of fine lines and a substrate surface, a radiation-curable adhesive coating material being such that, when radiation cured, will integrally bond to the substrate surface, but not to the material of the thermoplastic film master; pressing the film master and substrate together with the coating interposed to cause the surface of the coating adjacent the film master to become impressed with a faithful reproduction of the predetermined fine line diffraction pattern of the film master; passing the pressed together thermoplastic film master and substrate under a radiation curing station to radiation-cure the adhesive coating to set the impressed diffraction pattern in said coating surface upon the radiation-curing of the coating, while integrally bonding the coating to the substrate surface; and stripping the resulting integral diffraction-patterned coated substrate from the flexible thin thermoplastic film master.

2. A method as claimed in claim 1 and in which the thermoplastic film master is one of polypropylene, polyurethane, vinyl and polyester.

3. A method as claimed in claim 2 and in which the radiation is one of e.b. and u.v., and the adhesive coating is one of a radiation-curable acrylate, polyester, urethane, epoxy, pre-radical and cationic curable materials.

4. A method as claimed in claim 3 and in which the radiation is e.b. and/or u.v., the adhesive coating is of the order of about 0.0625–0.625 mils in thickness, and the e.b., if used, is produced at voltages of the order of about 120–130 KV at a dose of about 2–5 megarads, and the u.v., if used, is of the order of about 300–600 watts/inch.

5. A method as claimed in claim 1 and in which the thermoplastic film master is of thickness of the order of from about 48 gauge to about 142 gauge.

6. A method as claimed in claim 1 and in which the substrate is selected from the group consisting of paper, board, textile, non-woven fabric, plastic and metal substrates of all desired thicknesses.

7. A method as claimed in claim 3 and in which the coating is one of epoxy, urethane, polyester, and epoxy acrylate.

8. A method as claimed in claim 1 and in which the adhesive coating is one of clear, pigmented and tinted.

9. A method as claimed in claim 1 and in which the thermoplastic film master is provided with a thin metallized deposit.

* * * * *

UNITED STATES PATENT AND TRADEMARK OFFICE
CERTIFICATE OF CORRECTION

PATENT NO. : 6,358,442 B1
DATED : March 19, 2002
INVENTOR(S) : William Delaney and Richard Hovasse It is certified that error appears in the above-identified patent and that said Letters Patent is hereby corrected as shown below:

<u>Title page,</u>
Line 1, please correct "Animated" to read -- Non-Laminated --.

<u>Drawings,</u>
Fig. 3 please exchange the lead lines at the far right of the drawing of "I" and "P-A"

Signed and Sealed this

Eighteenth Day of June, 2002

Attest:

JAMES E. ROGAN
Attesting Officer
Director of the United States Patent and Trademark Office